Oct. 24, 1961 — K. E. GOLDEN — 3,005,378
FOLDED PLASTIC STEREOSCOPIC VIEWER
Filed Dec. 7, 1959 — 3 Sheets-Sheet 1

INVENTOR.
KENNETH E. GOLDEN
BY
Buckhorn, Cheatham & Blore
ATTORNEYS

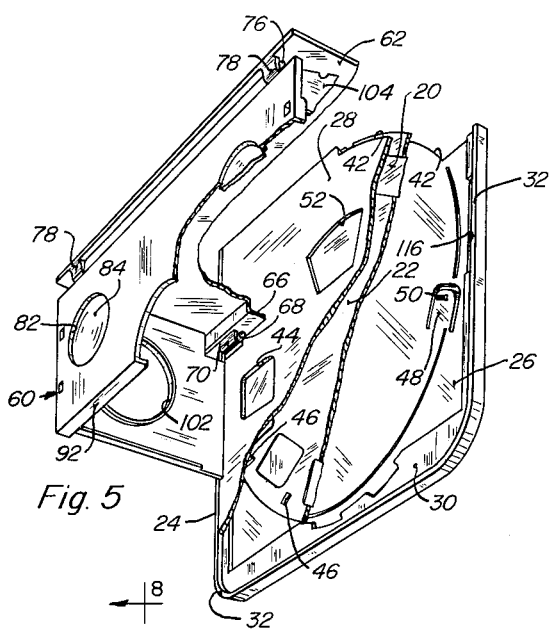
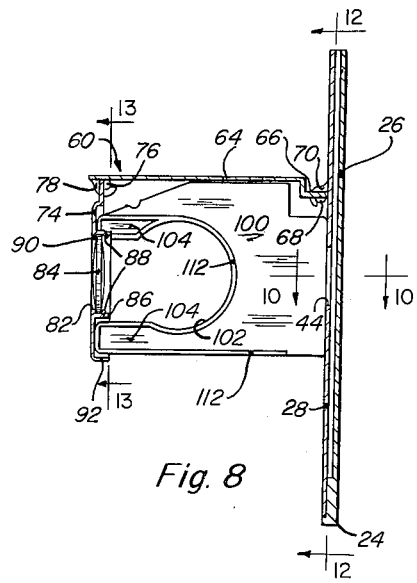
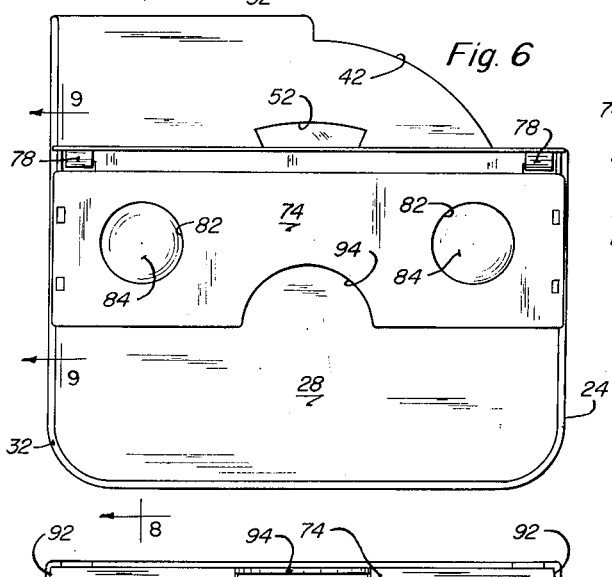
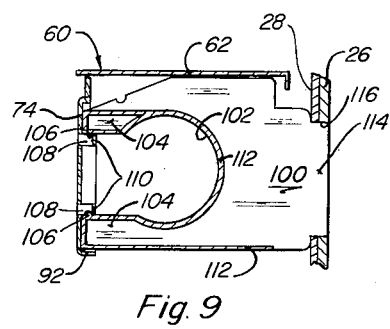
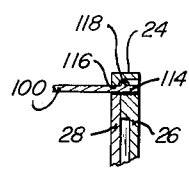
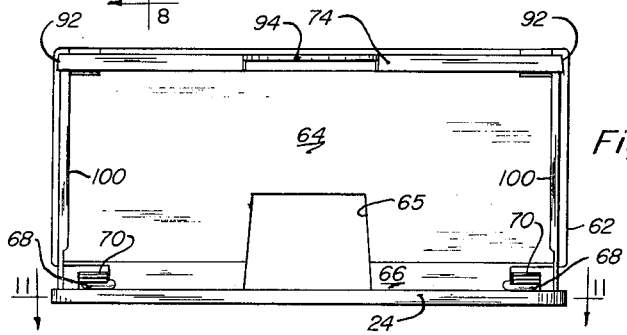

Oct. 24, 1961 K. E. GOLDEN 3,005,378
FOLDED PLASTIC STEREOSCOPIC VIEWER
Filed Dec. 7, 1959 3 Sheets-Sheet 3

INVENTOR.
KENNETH E. GOLDEN
BY
Buckhorn, Cheatham, & Blore
ATTORNEYS

3,005,378
FOLDED PLASTIC STEREOSCOPIC VIEWER
Kenneth E. Golden, Portland, Oreg., assignor to Sawyer's Inc., Progress, Oreg., a corporation of Oregon
Filed Dec. 7, 1959, Ser. No. 857,698
4 Claims. (Cl. 88—29)

The present invention relates to a stereoscopic viewing device and more particularly to a collapsible stereoscopic viewer.

It is a principal object of the present invention to provide a collapsible stereoscopic viewer which may be inexpensively manufactured of molded plastic parts.

A further object of the invention is to provide a collapsible viewer which may be readily erected or collapsed by the user.

Still another object of the present invention is to provide a collapsible stereoscopic viewer which may be collapsed into a compact assemblage that may be conveniently carried or packaged for mailing.

Another object is to provide novel means for locating stereo pairs in viewing position.

Still other objects and advantages of the invention will become more apparent hereinafter.

In accordance with the illustrated embodiment, I have provided a viewing device made of molded plastic parts including portions defining a holder for a carrier of stereoscopic views. Mounted upon such holder is a collapsible eye piece housing which when erected maintains magnifying lenses at a desired focal distance from the views in the holder and which when collapsed fits snugly against the carrier holder to facilitate carrying or mailing of the viewer.

For a more detailed description of the invention, reference is made to the accompanying drawings wherein:

FIG. 5 is a view similar to FIG. 1 with portions of the viewer being broken away to show details thereof;

FIG. 6 is a front elevation of the erected viewer;

FIG. 7 is a bottom view of the erected viewer;

FIG. 8 is a sectional view taken along line 8—8 of FIG. 6;

FIG. 9 is a sectional view taken along line 9—9 of FIG. 6;

FIG. 10 is an enlarged fragmentary sectional view taken along line 10—10 of FIG. 8;

Figures 1, 2:
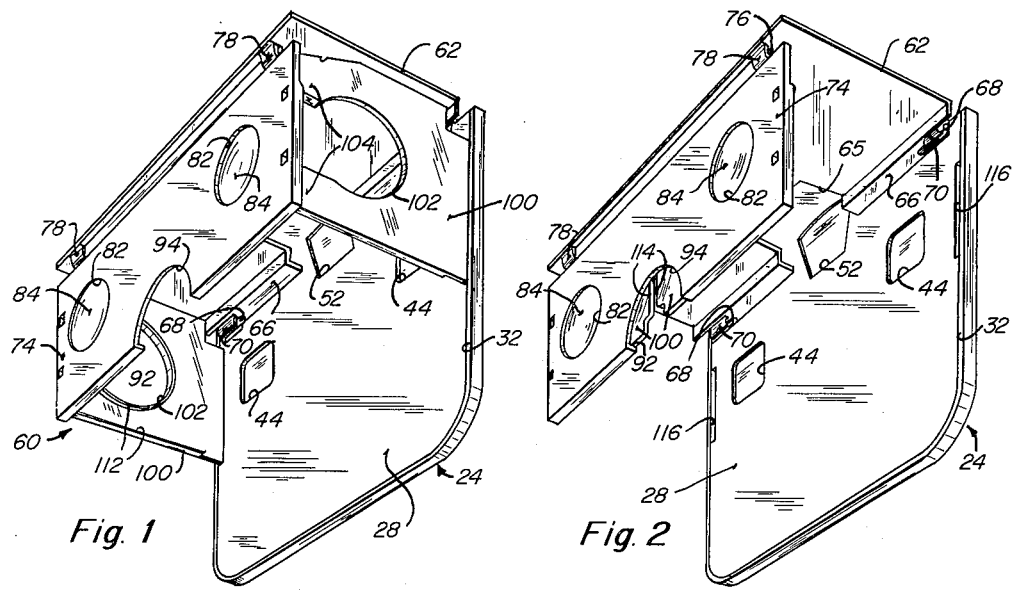
FIG. 1 is a perspective view of an erected viewer made in accordance with the invention.
FIG. 2 is a similar view showing the viewer in partially collapsed position.

The viewer illustrated in the drawings is designed for viewing stereoscopic transparencies 20 mounted in a carrier comprising a view holding disc 22 such as is shown and described in Patent 2,189,285 to W. B. Gruber. The viewer comprises a carrier holding portion 24 including a plate-like rear member 26 and a front member 28. The rear member 26 is preferably molded of a light translucent plastic and is formed about three sides of its periphery with a ledge 30 which is of slightly greater thickness than the thickness of a disc 22. The front member 28 is molded of an opaque plastic and is secured by suitable means such as an adhesive upon the ledge 30 whereby the front and rear members 28, 26, respectively, are secured together in parallel relation and define a space therebetween for receiving the carrier or disc 22 which may be inserted through the open or top end of the holder 24. The rear member 26 may be provided with a peripheral flange 32 which properly positions the front member 28 thereupon.

Figure 11:
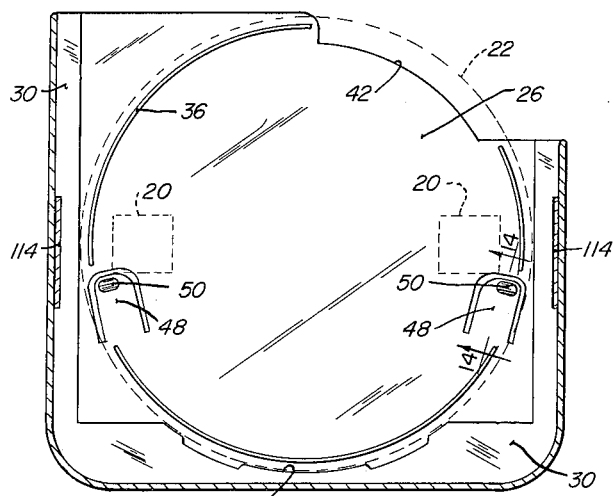
FIG. 11 is a sectional view taken along line 11—11 of FIG. 7.

With particular reference to FIG. 11, the distance between the ledge 30 on the opposite sides of the rear member 26 is substantially equal to the diameter of the disc 22, which is indicated in FIG. 11 in dotted lines. The bottom portion of the ledge 30 is provided with an arcuate recess 34 against the bearing surface of which the disc 22 rests when it is in operative position. Thus, the side surfaces of the step 30 and the recess 34 define bearing surfaces for the disc 22 to maintain it in position. To minimize the surface area of the disc in engagement with the members 26, 28, and thus minimize the frictional resistance to its rotation, the inner surfaces of such members are preferably provided with slightly raised ribs indicated at 36 on the member 26 (FIG. 11) and at 38 and 40 on the member 28 in FIG. 12. As best shown in FIGS. 5, 6, 11 and 12, the members 26, 28 are each provided with a cut-away portion 42 in the upper right-hand corner thereof so as to permit a portion of the reel 22 to project so that it may be rotated by the user to bring the paired transparencies into viewing position opposite the light transmitting openings 44 provided in the front member 28.

Figure 14:
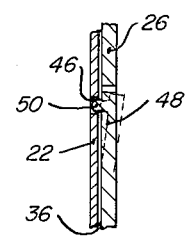
FIG. 14 is a fragmentary sectional view taken along line 14—14 of FIG. 11.
Figure 12:
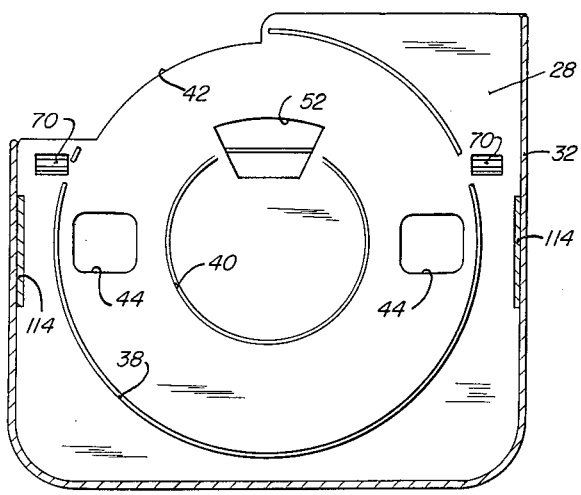
FIG. 12 is a sectional view taken substantially along line 12—12 of FIG. 8.

The disc 22 is conventionally formed with a plurality of radially spaced slots 46 therein which are adapted to be utilized in rotating the disc in a viewer such as that shown in the Gruber Patent No. 2,511,334 and to locate the disc with respect to the eye pieces of such a viewer, the slots 46 having a predetermined relation with respect to the position of the opposite pairs of views 20. In the viewer of the invention, means are provided to position a reel 22 with a pair of views thereof opposite the openings 44. Such means comprises in the illustrated embodiment a pair of integral tongues 48 formed in the member 26 and each of which is provided with a small protuberance 50. As shown in FIG. 14, these protuberances are adapted to engage within the reel slots 46 when the reel is positioned with a pair of views opposite the openings 44. However, when force is imparted to the reel in rotational direction, the edges of the slots ride over the protuberances to cam the tongues and protuberances to an out-of-the-way position indicated by dotted lines in FIG. 14. When the next pair of slots 46 is positioned opposite the pair of protuberances 50, the tongues will spring back to their normal position tending to stop movement of the reel whereupon the operator will know that the reel is correctly positioned and can cease to rotate the same until he desires to move another pair of views into viewing position.

The front member 28 may also be provided with an opening 52 through which printed legends on the reel may be read to indicate the view visible through the openings 44.

Figures 3, 4:
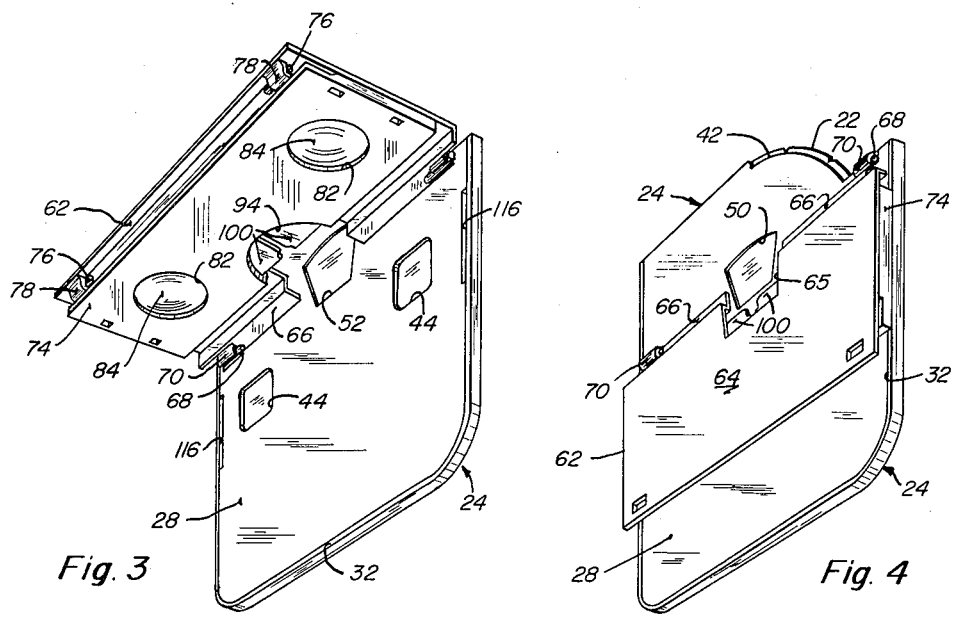
FIG. 3 is a view showing the viewer in a further stage of collapsing thereof.
FIG. 4 is a perspective view of the collapsed viewer.

Mounted upon the front member 28 is a lens carrying housing 60 which includes a molded plastic top plate 62 having a relatively large, rectangular body portion 64 and a downwardly stepped edge portion 66 which is immediately adjacent the front member 28. Means are provided to hinge the edge portion 66 of the front member 28 and which means may comprise a pair of pins 68 extending from the opposite ends of the edge portion 66 and which pins are adapted to fit within hinging loops 70 formed integrally with the front member 28. Such hinge means permit the top plate 62 to swing between an erected position wherein it extends substantially normal to the front member 28 as shown in FIG. 1 and a collapsed position wherein the body portion 64 is parallel to but spaced from the front member 28 by a predetermined distance and as shown in FIG. 4. The top plate 62 is provided with a cut-out 65 to permit viewing of the legends appearing in the opening 52.

Hinged to the front edge of the top plate 62, that is the edge thereof opposite the edge portion 66, is a front, eyepiece holding plate 74 which also may be of molded plastic. In the illustrated embodiment, the front plate 74 is provided with a pair of oppositely projecting hinge pins 76 along its top edge which are adapted to fit within hinge loops 78 formed integrally on the top plate 62. This hinging arrangement permits the front plate 74 to swing between an erected position wherein it is normal to the top plate 62 as shown in FIGS. 1, 8 and 9 and a collapsed position wherein it is in parallel relation with the under surface of the top plate 62 as shown in FIGS. 3 and 4.

Figure 15:
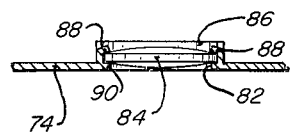
FIG. 15 is an enlarged sectional view taken along line 15—15 of FIG. 13.

The front plate 74 is provided with a pair of lens receiving openings 82 and suitable means are provided to secure a pair of lenses 84 within the openings. The lenses may be ground but preferably are molded plastic lenses. In the illustrated embodiment, the front plate 74 is provided with a circular flange 86 projecting rearwardly about each of the lens openings 82 and within which flanges the lenses 84 are received. Portions 88 of the flanges 86 are then deflected over the lenses 84 so as to clamp the lenses between such portions and the shoulder 90 defined by the flanges about the lens openings (see FIG. 15).

The front plate 74 is also provided with a flange 92 along the side and bottom edges of the periphery thereof (see FIGS. 8 and 9) and which flange is adapted to engage the bottom surface of the top plate 62 when the front plate is folded thereagainst to maintain the plates in parallel relation. The front plate 74 is also formed with a cut-out portion 94 to admit the bridge of the nose of the user of the viewer.

Figure 13:
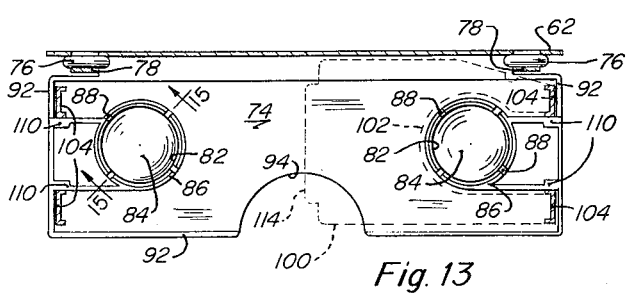
FIG. 13 is a sectional view taken substantially along line 13—13 of FIG. 8.

Hingedly connected to the opposite side edges of the front plate 74 is a pair of molded plastic side plates 100. The side plates 100 are of general rectangular outline, but each is formed with a keyhole shaped opening 102 defined in part by opposite arms 104 which have formed thereon slight projections 106 (see FIG. 9) adapted to fit within cooperative openings 108 formed in ribs 110 on the inner surface of the front plate 74. As shown by dotted lines in FIG. 13, the side plates 100 are adapted to be folded against the inner surface of the front plate 74 and in which position the opening 102 fits about the lens holding flanges 86 and the ribs 110. The hinge arrangement also permits the side plates 100 to move from the collapsed position adjacent the rear surface of the front plate 74 to an erected position normal to the front plate 74 and as shown in FIGS. 1, 5, 7, 8 and 9. Strengthening ribs 112 may be provided in the side plates 100 around the opening 102 and along the bottom edge.

The side plates 100 and the front member 28 of the carrier holding portion preferably are provided with interengaging means to hold the side plates in erected position. In the illustrated embodiment of the invention, the side plates 100 are each provided with a tongue 114 adapted to fit within slots 116 formed through the front member 28 and rear member 26. A small locking button 118 may be formed on each of the side plates 100 to engage beneath the edge of the front member 28 and prevent inadvertent removal of the side plates (see FIG. 10).

As will be evident all of the parts of the viewer may be molded separately and easily and quickly assembled. The members 26, 28 will be secured together as by an adhesive whereafter the parts of the housing 60 are assembled together by snapping the hinge pins or buttons thereof into the corresponding loop or recess.

The movements to collapse or erect the viewer are clearly apparent from FIGS. 1 to 4, inclusive. FIG. 1 illustrates the viewer in its erected position. As a first step in collapsing the viewer, the side plates 100 are withdrawn from their engagement with the carrier holding portion, this requiring a slight upward tilting of the top plate 62. Thereafter, the side plates 100 are swung against the inner surface of the front plate 74 and the front plate is then swung up against the under surface of the top plate 62. The whole assembly can then be swung down against the front member 28 as shown in FIG. 4. To erect the viewer, the movements are just reversed.

It will be observed that in its collapsed position, the top plate 62 is in parallel relation to the surface of the front member 28 and the front plate 74 extends between the front member and the top plate 74 to maintain this relationship. Thus, the top plate 62 is supported sufficiently to prevent any breakage of the top plate by inadvertent compression and deflection of the same.

In its folded condition, the viewer is adapted to be carried easily in the pocket of the viewer and can be mailed without difficulty.

While the viewer illustrated herein is particularly adapted for holding disc or reel type carriers for stereoscopic transparencies, obviously the invention herein is equally adaptable for use with film carriers of other types by suitable modification of the carrier holding portion.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A collapsible stereoscopic viewer for viewing stereoscopic transparencies mounted in a flat carrier, said viewer comprising a flat, molded plastic holder for said carrier including a front member and a rear member, said front member being formed with a pair of light transmitting openings and the aligned portions of said rear member being of a light translucent materials, means on said members for supporting said carrier with said transparencies aligned with said light transmitting openings, a lens carrying housing mounted on said front member including a molded plastic top plate, means hingedly connecting one edge of said top plate to said front member to permit said top plate to swing between an erected position substantially normal to said front member and a collapsed position wherein said top plate is parallel to but spaced from said front member, a molded plastic front plate hingedly connected to the edge of said top plate opposite said one edge portion, said front plate being swingable between an erected position normal to said top plate and a collapsed poistion in which said front plate is swung into parallel relation with the undersurface of said top plate, a pair of lenses, means on said front plate mounting said lenses therein, a pair of molded plastic side plates hingedly connected one to each of the opposite side edges of said front plate for swinging movement between a collapsed position parallel and adjacent to the rear surface of said front plate and an erected position normal to said front plate, and means on said side plates and said front member for releasably attaching said side plates to said front member to hold said housing in erected position.

2. A collapsible stereoscopic viewer for viewing stereoscopic transparencies mounted in a flat carrier, said viewer comprising a carrier holding portion including a pair of molded plastic plate-like members including a rear member and a front member secured together in parallel relation and defining a space therebetween for receiving said carrier, said front member being formed with a pair of light transmitting openings and the aligned portions of said rear member being of a light translucent material, said members having means for supporting said carrier with said transparencies aligned with said light transmitting openings, and a lens carrying housing mounted on said front member including a top plate adapted to extend normally from said front member in the erected position, means hingedly connecting one edge of said top plate to said front member to permit said top plate to swing between said erected position and a collapsed position wherein said plate is parallel to but spaced from said front member by a predetermined distance, a front plate hingedly connected to the edge of said plate opposite said one edge, said front plate being swingable between an erected position normal to said top plate and a collapsed position in which said front plate is swung into parallel relation with the undersurface of said top plate, a pair of lenses, means on said front plate mounting said lenses therein, said front plate having a flange along the periphery thereof projecting from the rear surface thereof, said flange being adapted to engage the surface of said top plate when said front plate is folded thereagainst to maintain said plates in parallel relation, said predetermined distance being equal to the thickness of said front plate as measured with the said flanges thereof, a pair of side plates hingedly connected one to each of the opposite side edges of said front plate for swinging movement between a collapsed position between said front and top plates and an erected position normal to said front plate, said side plates having a thickness substantially equal to the height of said flanges, and cooperating means on said side plates and said front member for releasably engaging said side plates to hold said housing in erected position.

3. A collapsible stereoscopic viewer for viewing stereoscopic transparencies mounted in a flat carrier, said viewer comprising a carrier holding portion including a pair of molded plastic plate-like members including a rear member and a front member secured together in parallel relation and defining a space therebetween for receiving said carrier, said rear member being of a light translucent material, said front member being formed with a pair of light transmitting openings, said members having means for supporting said carrier with said transparencies aligned with said light transmitting openings, and a lens carrying housing mounted on said front member including a top plate including a flat, rectangular body portion adapted to extend normally from said front member in the erected position, means hingedly connecting one edge of said top plate to said front member to permit said top plate to swing between said erected position and a collapsed position wherein said body portion is parallel to but spaced from said front member by a predetermined distance, a front plate hingedly connected to the edge of said body portion opposite said one edge, said front plate being swingable between an erected position normal to said top plate and a collapsed position in which said front plate is swung into parallel but predetermined spaced relation with the undersurface of said top plate, a pair of lenses, means on said front plate mounting said lenses therein, a pair of side plates hingedly connected one to each of the opposite side edges of said front plate for swinging movement between a collapsed position between said front and top plates and an erected position normal to said front plate, tongue means on said side plates and notch means on said front member for releasably engaging said tongue means to hold said housing in erected position.

4. A collapsible stereoscopic viewer for viewing stereoscopic transparencies mounted in a flat carrier, said viewer comprising a carrier holding portion including a pair of molded plastic, plate-like members including a rear member and a front member secured together in parallel relation and defining a space therebetween for receiving said carrier, said rear member being of a light translucent material, said front member being formed with a pair of light transmitting openings, said members having means for supporting a said carrier with said transparencies aligned with said light transmitting openings, and a lens carrying housing mounted on said front member including a top plate including a flat, rectangular body portion adapted to extend normally from said front member in the erected position, said top plate having a downwardly stepped edge portion, means hingedly connecting said edge portion to said front member to permit said top plate to swing between said erected position and a collapsed position wherein said body portion is parallel to but spaced from said front member by a predetermined distance, a front plate hingedly connected to the edge of said body portion opposite said edge portion, said front plate being swingable between an erected position normal to said top plate and a collapsed position in which said front plate is swung into parallel relation with the undersurface of said top plate, a pair of lenses, means on said front plate mounting said lenses therein, said front plate having a flange along the periphery thereof projecting from the rear surface thereof, said flange being adapted to engage said undersurface of said top plate when said front plate is folded thereagainst to maintain said plates in parallel relation, said predetermined distance being equal to the thickness of said front plate as measured with the said flanges thereof, a pair of side plates hingedly connected one to each of the opposite side edges of said front plate for swinging movement between a collapsed position parallel and adjacent to the rear surface of said front plate and an erected position normal to said front plate, said side plates having a thickness no greater than the height of said flanges, tongue means on said side plates, and cooperating notch means on said front member for releasably engaging said tongue means to hold said housing in erected position.

References Cited in the file of this patent

UNITED STATES PATENTS

| | | |
|---|---|---|
| 1,685,584 | Dean | Sept. 25, 1928 |
| 2,572,602 | Dilks | Oct. 23, 1951 |
| 2,872,844 | Van Tuyl | Feb. 10, 1959 |